United States Patent
Bondi et al.

[11] Patent Number: 6,061,811
[45] Date of Patent: May 9, 2000

[54] CIRCUITS, SYSTEMS, AND METHODS FOR EXTERNAL EVALUATION OF MICROPROCESSOR BUILT-IN SELF-TEST

[75] Inventors: James O. Bondi, Plano; Joel J. Graber; Donald E. Steiss, both of Richardson; John M. Johnsen, Dallas, all of Tex.

[73] Assignee: Texas Instruments Incorporated, Dallas, Tex.

[21] Appl. No.: 08/961,788

[22] Filed: Oct. 31, 1997

[51] Int. Cl.$^7$ .................................................. G06F 11/00
[52] U.S. Cl. ........................................ 714/30; 395/500.05
[58] Field of Search .................................. 714/30, 18, 25, 714/27, 32, 39, 41, 45, 46, 47, 48, 57, 733, 735, 31; 395/500.05, 500.49; 365/201

[56] References Cited

U.S. PATENT DOCUMENTS

| | | | |
|---|---|---|---|
| 5,301,156 | 4/1994 | Talley ........................................ | 365/201 |
| 5,491,790 | 2/1996 | Keeley et al. ...................... | 395/183.12 |
| 5,515,501 | 5/1996 | LaBerge et al. ................... | 395/182.08 |
| 5,548,713 | 8/1996 | Petry et al. ........................ | 395/183.01 |
| 5,553,236 | 9/1996 | Revilla et al. ..................... | 395/183.01 |
| 5,638,382 | 6/1997 | Krick et al. ............................. | 371/22.5 |
| 5,657,330 | 8/1997 | Matsumoto ............................. | 371/22.5 |
| 5,661,732 | 8/1997 | Lo et al. ................................. | 371/22.2 |
| 5,668,817 | 9/1997 | Adham .................................... | 371/22.4 |
| 5,732,209 | 3/1998 | Vigil et al. .......................... | 395/183.06 |
| 5,883,843 | 3/1999 | Hii et al. ................................. | 365/201 |

*Primary Examiner*—Robert W. Beausoliel, Jr.
*Assistant Examiner*—Nadeem Iqbal
*Attorney, Agent, or Firm*—Rebecca Mapstone Lake; Richard L. Donaldson

[57] ABSTRACT

A microprocessor (10) operating in response to a clock signal (CLK) having a clock period. The microprocessor includes a readable memory (16), and this readable memory stores code (BIST) for performing diagnostic evaluations of the microprocessor. The diagnostic evaluations include a first evaluation to occur under non-failure operation at a first clock period (24) and a last evaluation to occur under non-failure operation at a last clock period (26). The microprocessor further includes circuitry (14) for issuing a series of addresses to the readable memory in order to address the code for performing diagnostic evaluations of the microprocessor. Still further, the microprocessor includes a conductor (D0) externally accessible and for providing a signal from the microprocessor. Lastly, the microprocessor includes circuitry (12) for outputting a diagnostic signal on the externally accessible conductor during performance of the diagnostic evaluations. Given the externally accessible conductor, divergence of the diagnostic signal from a predetermined pattern before the last dock period indicates a failure of the diagnostic evaluations before the last clock period.

25 Claims, 3 Drawing Sheets

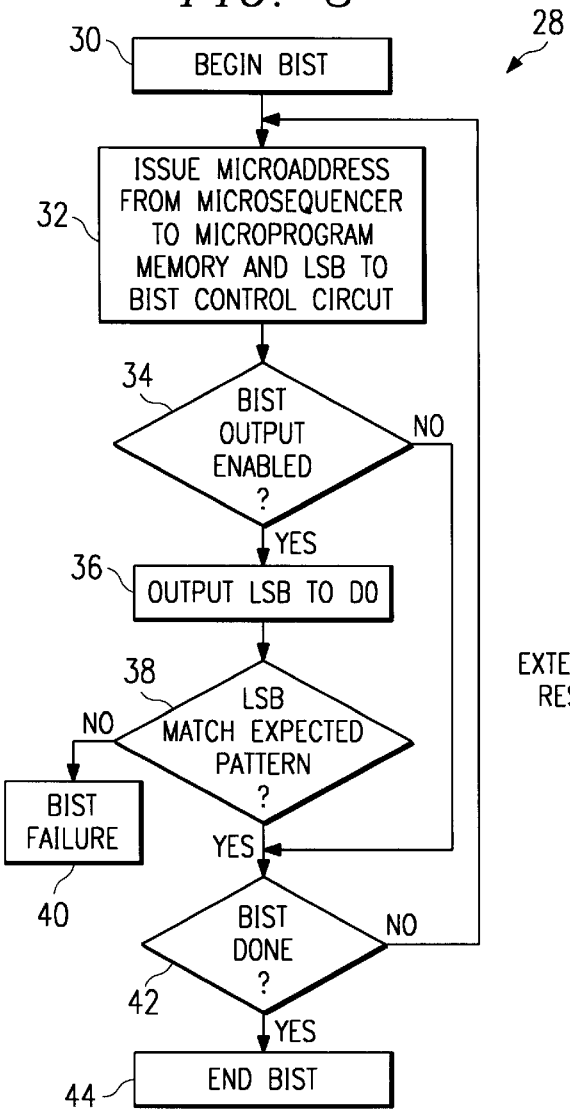
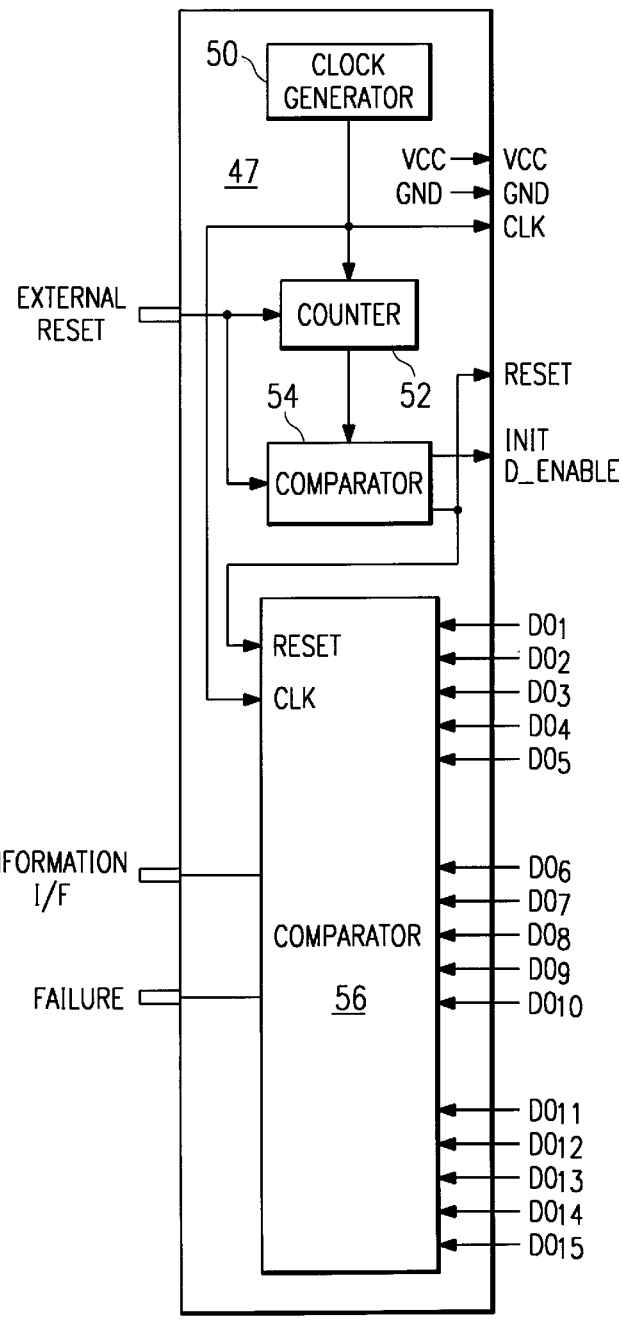

CIRCUITS, SYSTEMS, AND METHODS FOR EXTERNAL EVALUATION OF MICROPROCESSOR BUILT-IN SELF-TEST

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The embodiments described below involve the field of microprocessors. Microprocessor-based computer systems have become incredibly prolific and are used at all levels of the public and private sector. With the vast increase of microprocessors in circulation has come increased design demands in many aspects of the microprocessor, including its reliability. In this regard, microprocessor manufacturers are known to test their microprocessors using various techniques before making the device available to a consumer. Such tests include testing of device design, and also specific tests for each individual integrated circuit before it is shipped. In these respects, therefore, considerable resources are devoted to such testing, and the present embodiments are directed to further improving various such testing activities.

For various integrated circuits, including microprocessors, testing is often used to address a known and generally accepted model for integrated circuit life span. Specifically, the model includes three periods of device reliability on a statistical basis over the life span of the device. In the first period, the model predicts that a certain percentage of integrated circuits will experience defects early in the life of the device, such as in its first few months to one year or so of normal operation. In the second period, it is anticipated that far fewer devices than those which experience problems during the first period will fail for an extensive period of time. Indeed, based on various considerations, the second period may extend up to ten years or more. Lastly, in the third period, the model predicts again that some devices will fail, with the amount of failures being considerably higher than those expected during the second term of the model.

One type of known testing to attempt to minimize the effect of the above model is known as burn-in. During the burn-in procedure, various device parameters are set to extremes beyond the normal operational specifications of the device. For example, input voltages may be increased to exceed, in absolute value, the specified operational limits of the device. As another example, the temperature to which the device is exposed also may be increased to exceed the specified operational limits for the device. Still other examples are known in the art. In any event, the burn-in procedure is believed to significantly shorten the duration of the first period of the above-discussed model. Thus, a particular device which may have failed after a year of normal operations is more likely to fail in a considerably shorter amount of time during burn-in As a result, a manufacturer may expose its integrated circuits to a burn-in period far shorter than the duration of the first period described above, and still identify many of those devices which would have failed over a greater period of time without the burn-in procedure. Consequently, the failed devices may then be removed from those which satisfactorily survive the burn-in procedure, thereby yielding a greater percentage of reliable devices for shipment to consumers.

In the context of microprocessors, another known type of testing to attempt to minimize the effect of the above model is to include some self-testing mechanism within the microprocessor. For example, a microprocessor typically includes a read only memory (ROM) for storing various programs for use in operating the microprocessor. Often, the ROM is referred to as a microROM and the programs it stores are sometimes referred to as microcode. Given this functionality, and in the context of testing, often a manufacturer includes one or more microcode programs in the microROM directed at testing the microprocessor. Alternatively, the testing operations may be implemented in some other on-device hardware. In any event, the test as a whole is sometimes referred to as a built-in self-test (BIST). The BIST is typically carried out at power-on or directed through some type of command such as during a scan test. Typically, the BIST checks more or less all chip components and, at the conclusion of the BIST, writes a code into a register. Thus, given that the duration of the BIST is known, the register may be examined at the end of the duration to determine whether the BIST completed and whether the device passed the checks performed by the BIST.

While the above approaches often assist in identifying defective microprocessors before those devices reach the market, the present inventors have identified various limitations of such techniques. For example, a failure during burn-in may require evaluation of numerous inputs and outputs of the device during the test. As another example, often BIST will only return a code at the end of the test and, therefore, there is no indication of the progression of the test before that end is reached. Moreover, even once the end of BIST is reached, the code (if any) resulting from a failure may not identify what caused the failure, or when during the BIST the failure occurred.

In view of the above, there arises a need to address the drawbacks of prior art testing techniques, as is accomplished by the embodiments provided below.

BRIEF SUMMARY OF THE INVENTION

In the preferred embodiment, there is a microprocessor operating in response to a clock signal having a dock period. The microprocessor includes a readable memory, and this readable memory stores code for performing diagnostic evaluations of the microprocessor. The diagnostic evaluations include a first evaluation to occur under non-failure operation at a first dock period and a last evaluation to occur under non-failure operation at a last clock period. The microprocessor further includes circuitry for issuing a series of addresses to the readable memory in order to address the code for performing diagnostic evaluations of the microprocessor. Still further, the microprocessor includes a conductor externally accessible and for providing a signal from the microprocessor. Lastly, the microprocessor includes circuitry for outputting a diagnostic signal on the externally accessible conductor during performance of the diagnostic evaluations. In the preferred embodiment, the diagnostic signal comprises a portion of each of the series of addresses. Given the externally accessible conductor, divergence of the diagnostic signal from a predetermined pattern before the last clock period indicates a failure of the diagnostic evaluations before the last clock period. Other circuits, systems, and methods are also disclosed and claimed.

BRIEF DESCRIPTION OF THE SEVERAL VIEWS OF THE DRAWING

FIG. 3 illustrates a flow chart of a method of testing a microprocessor such as that shown in FIG. 1;

FIG. 4b illustrates a block diagram of a driver board to communicate signals to a and from the burn-in board of FIG. 4a.

DETAILED DESCRIPTION OF THE INVENTION

Figure 1:
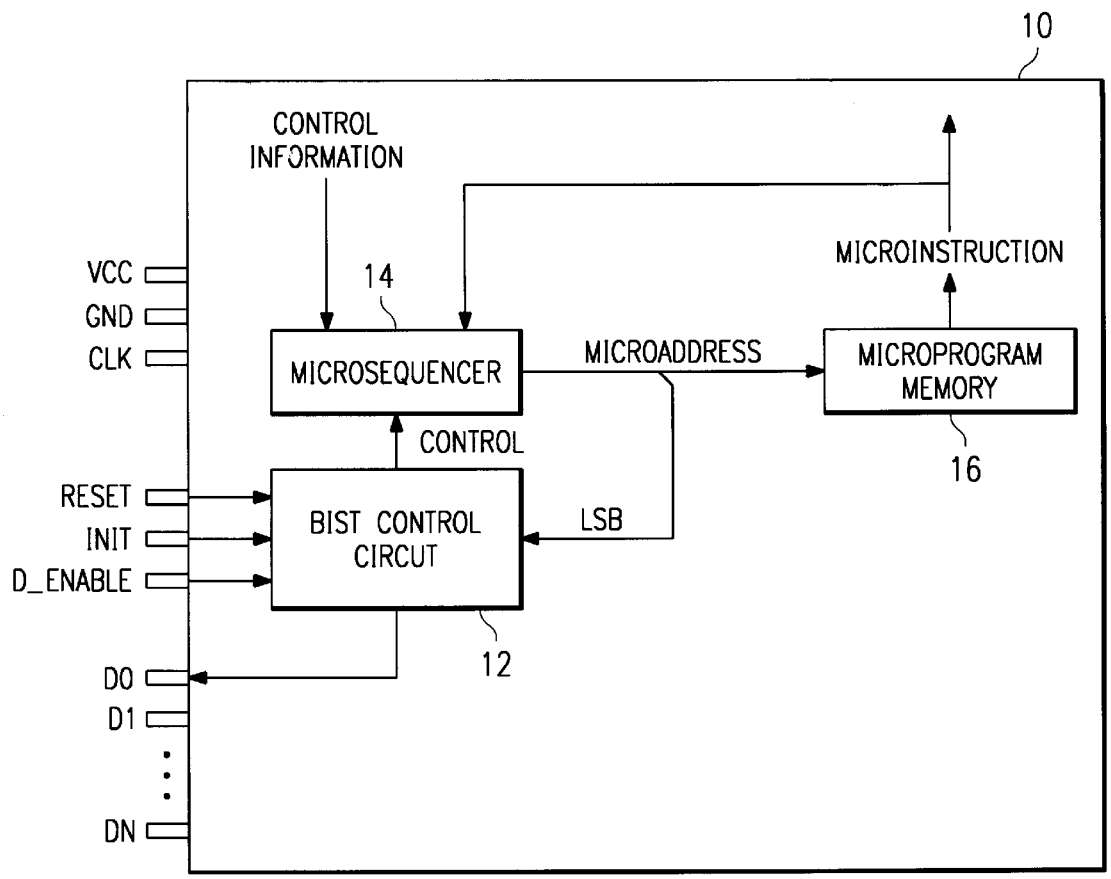
FIG. 1 illustrates a block diagram of microprocessor having a readable memory storing self-diagnostic code and an externally accessible output representative of the performance of that self-diagnostic code.

FIG. 1 illustrates a block diagram of a microprocessor designated generally at 10 and which is used by way of example to demonstrate the type of system in which the present embodiments may be incorporated. Turning then to microprocessor 10, it includes a plurality of pins along its edge and, therefore, which are externally accessible to provide the functionality set forth below. Before discussing the pins in detail note that only certain pins are shown in FIG. 1 to provide a context for the present embodiments, with it understood in the art that a microprocessor commonly includes numerous other pins or comparable signal conductors. Moreover, all of the pins described in this document may be arranged in different order or configuration and may have differing names while performing like functionality to that described herein.

The pins shown in FIG. 1 for purposes of all microprocessor operation include a VCC pin, a GND pin and a CLK pin, and each of these pins are used as known in the art Specifically, the VCC pin is for receiving the supply voltage for microprocessor 10, and may be (as is often in the art) duplicated numerous times along the pin arrangement of microprocessor 10 so as to provide multiple locations to supply voltage as well as to provide adequate sources of current Similarly, the GND pin is for receiving a ground potential for microprocessor 10, and again may be duplicated numerous times along the pin arrangement of microprocessor 10. Lastly, the CLK pin is the basic clock input pin for microprocessor 10 and is used to synchronize internal operations. Often, the frequency of the internal clock signal actually used by microprocessor 10 may be based upon the signal at the CLK pin as well as additional inputs to microprocessor 10. Lastly, while not shown in FIG. 1, it should be understood that the signals discussed immediately above are applied to numerous circuits within microprocessor and which require such signals as known in the art The remaining pins shown in FIG. 1 on microprocessor 10 include a RESET pin, an INIT pin, a D_ENABLE pin, and a number of data pins shown as D0 through DN. The RESET and INIT pins are involved with resetting and initializing microprocessor 10, respectively, and also commencing its built-in self-test (BIST) as described below. The D_ENABLE pin is involved with outputting a diagnostic code during the BIST, also as described below. With respect to the data pins, note first that D0 represents the least significant data bit and DN represents the most significant data bit Moreover, these pins are for communicating data bi-directionally with respect to microprocessor 10. Lastly, note that the number of overall data bits may vary based on the microprocessor, and for current day microprocessors are commonly on the order of 64 bits (i.e., N=63).

Looking now to the remaining illustrations of FIG. 1, microprocessor 10 further includes a BIST control circuit 12. BIST control circuit 12 is connected to receive more than one input which, in the preferred embodiment includes as inputs the signals from the RESET, INIT, and D_ENABLE pins. Moreover, BIST control circuit 12 is further connected to provide, in certain circumstances described below, an output to one (or a few) of the data pins. Specifically, in the preferred embodiment, the least significant bit data pin (i.e., D0) is connected as this output Note further that this same data pin may be further connected to other circuits for providing functionality other than that in connection with the BIST as described below. Lastly, BIST control circuit 12 is also connected to provide an output control signal to a microsequencer 14, described below.

Microsequencer 14 operates in conjunction with a microprogram memory 16, with such operation generally known in the art. Specifically, microprogram memory 16, which typically in the art is a read only memory referred to as the microROM or microcode ROM, is a fundamental unit of the microprocessor which receives a "microaddress" and, in response, outputs a "microinstruction." Note that microprogram memory 16 is illustrated as a read only memory by way only of example, and various other readable storage circuits could be used, such as random access memories, PLAs, or other storage circuits developed by a person skilled in the art. In any event, the circuit represents a readable memory which issues the above signal referred to in this document as a microinstruction. The microinstruction is a multiple bit signal, and the value of most if not all of those bits is used to control one or more aspects of the microprocessor. Moreover, the microinstruction, or a portion of the microinstruction, is fed back to microsequencer 14 because often this portion may form a next successive microaddress, or include a portion or information directed to issuing a next successive microaddress. Also in this regard, microsequencer 14 is shown as having a general input for receiving control information. This input is included merely to demonstrate that other signals may be received by microsequencer 14 which further affect a subsequent microaddress to be issued by microsequencer 14 to microprogram memory 16.

In addition to the known interaction between microsequencer 14 and microprogram memory 16 as described in the immediately preceding paragraph, in accordance with the present inventive embodiments a portion of each microaddress is connected from the output of microsequencer 14 as an input to BIST control circuit 12. In the preferred embodiment, this portion is the least significant bit (LSB) of the microaddress. As demonstrated below, in certain circumstances this LSB of the microaddress is then communicated by BIST control circuit 12 to data pin D0.

Before discussing the detailed operation of FIG. 1 in connection with the present inventive embodiments, some additional introductory detail is helpful regarding BIST operation in general. As mentioned above, microprogram memory 16 stores numerous microinstruction which may be output in response to respective microaddresses from microsequencer 14. In this regard, it is known in the art that a series of microinstruction may be included within microprogram memory 16 to perform the BIST operations. In other words, a program thread may be formed by having microinstruction which are addressed by successive microaddresses and output by microprogram memory 16 to test various, if not all, of the internal circuits of microprocessor 10. In this regard, often a manufacturer includes some level of self-testing code in the microprocessor microprogram memory, and such code may be run by the microprocessor to internally evaluate device failure before the device is delivered to a consumer, or in some instances the code also may be later run by the consumer system which includes the microprocessor. In the present embodiments, therefore, microprogram memory 16 stores sufficient microinstruction to perform a BIST in this manner.

Figure 2:
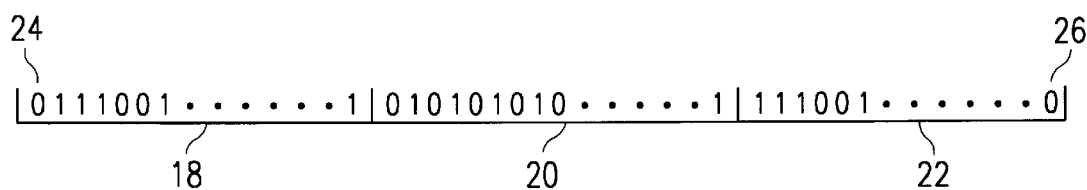
FIG. 2 illustrates a sequence of an expected pattern of least significant bits from a corresponding pattern of expected BIST microaddresses.

Given the above, since microprogram memory 16 stores BIST microinstruction, a person skilled in the art will appreciate that microprocessor 10 further includes circuitry to successively address each of those microinstruction in order to accomplish the BIST operations. In this regard, therefore, microsequencer 14 in the preferred embodiment operates to output microaddresses for this purpose (and may also do so using the above-discussed portion of the preceding microinstruction which is fed back from microprogram memory 16). Given, therefore, the need to issue these successive microaddresses, the encoding of each of these microaddresses is known by the time the microprocessor is manufactured. Thus, given the known microaddresses, and for reasons more evident below, FIG. 2 illustrates a series of the LSBs of these known microaddresses. The series of LSBs in FIG. 2 is separated into three groups evenly numbered 18, 20, and 22. For each clock cycle of proper BIST operation of microprocessor 10, a successive one of the LSBs should be part of the microaddress to microprogram memory 16. Moreover, because of the connections shown in FIG. 1, this same successive one of the LSBs is also connected to BIST control circuit 12. To demonstrate the ordering of the bit series over time, the LSB corresponding to a first clock cycle of the BIST operation is identified at 24 while the LSB corresponding to a last dock cycle of the BIST operation is identified at 26. Lastly, note that a typical BIST may be performed over a million or more clock cycles and, therefore, the bits shown in FIG. 2 are a very abbreviated example of the million or more corresponding LSBs which may occur over the entirety of the BIST.

Turning to the separate groups of FIG. 2, groups 18 and 22 both represent sequences of BIST microaddresses which vary depending on the particular desired microinstruction and its location within microprogram memory 16. Given the desired order and location of each such microinstruction, therefore, these values are established by the manufacturer and represent an expected pattern of LSBs for groups 18 and 22 under normal (i.e., non-failure) BIST operation. In other words, for each non-failure operation of the BIST, microsequencer 14 will generate the same pattern of bits for groups 18 and 22. Additionally, recall from above that the total of all bits in FIG. 2 may be on the order of a million or more bits. Given that range as an example, typically group 18 may be on the order of 100 Kbits while group 22 may be on the order of 1 Mbits. Between groups 18 and 22 is group 20 which is on the order of approximately 3 Kbits, and note that each bit within group 20 represents the logical complement of the bit immediately preceding itself and within group 20. Specifically, in the preferred embodiment, part of the BIST involves sequencing through an ascending succession of all, or most of, the microaddresses of microprogram memory 16. Thus, for such a succession, one skilled in the art will appreciate that the LSB of each corresponding microaddress will toggle back and forth forming the complementary pattern of group 20. Consequently, group 20, like groups 18 and 22, also represents an expected pattern of LSBs, but it is further known during the passage of group 20 that each bit will logically alternate in the manner described above.

Given the above introduction, FIG. 3 illustrates a flow chart of a preferred inventive method 28 of operating microprocessor 10 of FIG. 1 to perform an external evaluation of the BIST which includes the ability to externally monitor the BIST progression and detect failures in that progression Generally, however, note that method 28 involves both the actions of the microprocessor internally as well as an external testing procedure which may be used given those internal actions. Each of these aspects is discussed below.

Method 28 commences with step 30 by beginning the BIST. In the preferred embodiment, method 30 is accomplished in connection with the RESET and INIT pins. More specifically, to perform step 30, RESET and INIT are asserted, and RESET is then deasserted while INIT remains asserted. In response, in step 32, BIST control circuit 12 issues the illustrated control signal to microsequencer 14, causing microsequencer 14 to issue the first BIST microaddress to microprogram memory 16. Note further that when this first microaddress is output by microsequencer 14, its LSB is also connected back to BIST control circuit 12. In step 34, BIST control circuit 12 determines whether D_ENABLE is asserted. If D_ENABLE is not asserted, method 28 continues to step 42 discussed later. On the other hand, if D_ENABLE is asserted, method 28 continues to step 36.

In step 36, having determined that D_ENABLE is asserted, BIST control circuit 12 allows the LSB from the first BIST microaddress to pass to data pin D0. Note therefore that the D_ENABLE signal allows a pin (e.g., data pin D0) to be used for more than one purpose, that is, for outputting the LSB during BIST and for some other purpose during non-BIST operations. In the present embodiment, since data pin D0 is the shared pin in this manner, it may output the LSB during BIST (provided the D_ENABLE is asserted) and may output a data bit during non-BIST operation. Returning to step 36, once the LSB of the microaddress is output to data pin D0, this first bit should correspond to that of the first clock bit designated at 24 in FIG. 2. An evaluation of whether such a match occurs is then analyzed in step 38, discussed below.

Before discussing step 38, note that the D_ENABLE pin discussed above is shown by way of example as a separate designated pin for the above functionality (i.e., enabling the output of the LSB to data pin D0). However, because this functionality preferably occurs only during BIST and not during normal operation of microprocessor 10, a pin which is used for other purposes during normal operation may receive the enabling signal at the commencement of, or during, BIST, without having to have a separate pin. As still another alternative, the timing and relationship of the RESET and INIT signals could be set to also enable or disable the LSB output feature, without having to have a separate pin for this functionality. Still other alternatives will be ascertainable by a person skilled in the art. In any event, after step 36, method 28 continues to step 38 discussed below.

Steps 38 and 40 represent actions of the preferred method which are taken externally from microprocessor 10. Specifically, in step 38, it is determined whether the LSB output from step 36 matches the corresponding bit in the expected pattern for the given microprocessor. For example, using the expected pattern of FIG. 2, the first output LSB should match that of bit 24 in the first clock cycle and, therefore, should be a logical 0 rather than a logic 1. Thus, for the first LSB output after BIST commences, step 38 determines whether the LSB output during the first clock cycle of the BIST is a logical 0. If so, the method continues to step 42 whereas, if the LSB does not match the corresponding bit in the expected pattern, the method continues to step 40.

As an introduction to step 40, note that step 38 operates to identify an instance, if any, where the actual output LSB diverges from the corresponding expected LSB from the pattern of FIG. 2. This step 38 identification may be performed in various manners. For example, when an LSB is output from data pin D0, step 38 may be achieved using a real-time comparison of the LSB to a synchronized signal which presents a bit from the FIG. 2 expected pattern of LSBs. Thus, if the step 38 comparison finds a match between the expected LSB from the pattern and the actual LSB output at data pin DO, then proper operation is assumed to occur and method 28 continues to step 42. On the other hand, if the comparator indicates a mismatch, method 28 continues to step 40 to indicate that an error in the BIST has occurred. In other words, a divergence between the expected bit and the actual bit indicates that a BIST problem has occurred, such as the issuance of a microaddress other than that which was expected. Note that step 40, therefore, may store the results of the failed comparison in some manner so as to identify, within possibly one or a few additional dock cycles, where in the BIST microaddress sequence the failure occurred. Moreover, although not shown, after the failure of step 40 is identified, method 28 may either continue to step 42 for identification of possible successive microaddresses and likely successive BIST failures or, alternatively, may end the flow of method 28 having detected a failure in the BIST.

Step 42 determines whether BIST is done. In the preferred embodiment, this may be performed by counting the elapsed time period (e.g., clock cycles) and comparing it with the expected completion time to reach the conclusion of the BIST. In this instance, therefore, if the elapsed time period is less than expected completion time, BIST is not done and the method returns to step 32. To the contrary, if the elapsed time period is equal to or greater than the expected completion time, BIST is complete and, as shown in step 44, the test of method 28 is complete as well.

Given the above, note that method 28 preferably repeats for each LSB output at data pin D0 so long as each such bit matches the expected corresponding LSB of FIG. 2. Thus, for a completely successful run of the BIST through bit 26 corresponding to the last BIST clock cycle in FIG. 2, method 28 will repeat a million times assuming one million LSBs successively output at data pin D0. Note further, however, that during that million or so bit succession, a divergence at any time from the expected bit pattern of FIG. 2, which suggests a BIST failure, may be detected in some instances as quickly as within one clock cycle of the failure. Given this information, the manufacturer may identify the microinstruction corresponding to the pattern divergence and, from such information, may likely more quickly and efficiently determine the cause of the failure. As a result, the present embodiments permit improved external failure detection while a microprocessor is running BIST.

Figure 4A:
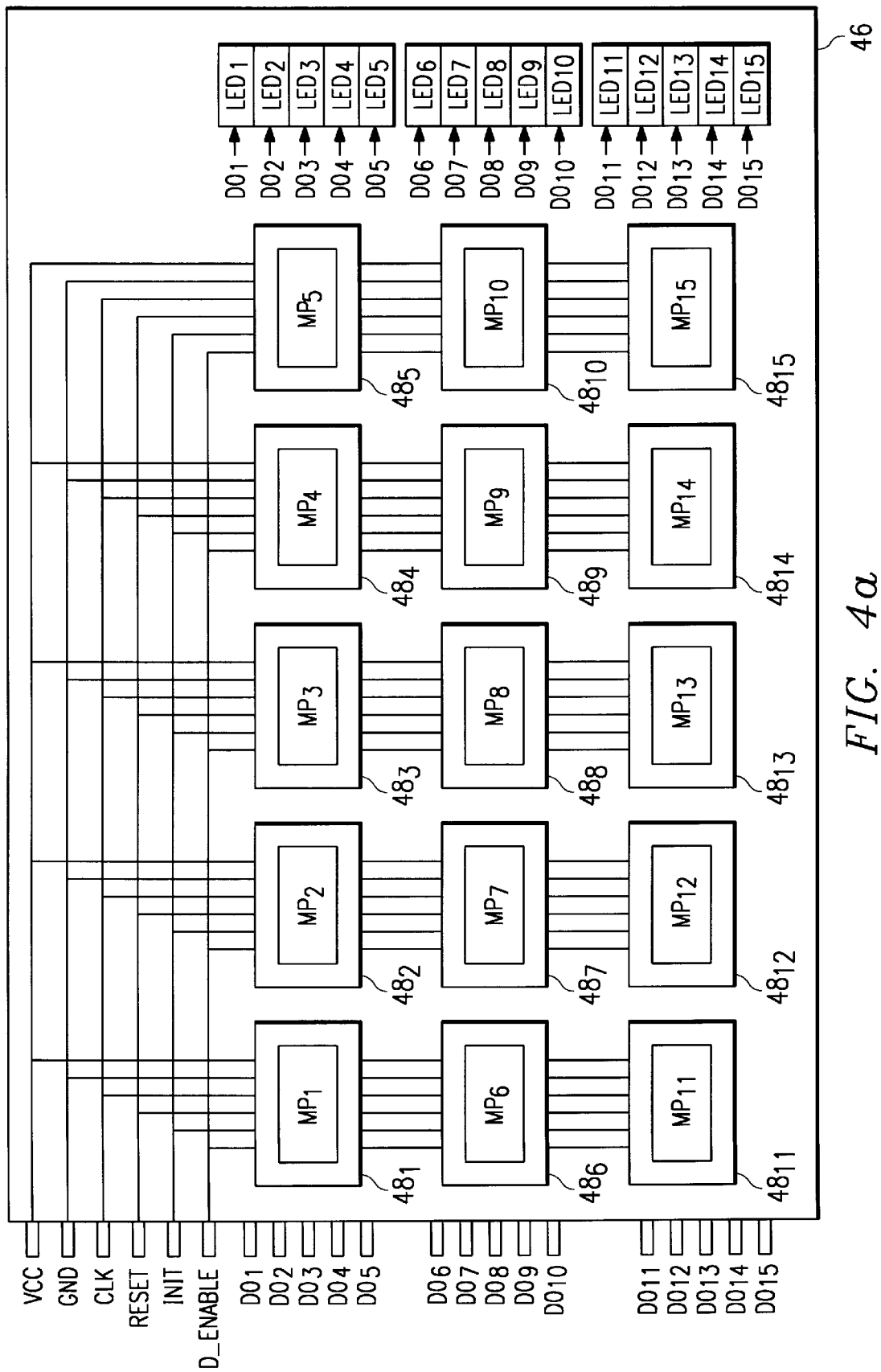
FIG. 4a illustrates a block diagram of a burn-in board with a group of microprocessors configured in the manner of the microprocessor of FIG. 1.

According to the present embodiments, note also that the above-described technique of real-time comparison of the LSB at D0 to the expected pattern is only one preferred approach, and still others are contemplated as within the inventive scope. For example, each successive LSB at D0 may be coupled to a storage device and, at a later time, compared to the expected pattern of LSBs. Again, such a technique may identify any divergence between the output LSBs and the expected pattern of LSBs. As yet another alternative embodiment, note that a visible indicator, such as a light emitting diode (LED), may be connected to the D0 pin during method 28. In this alternative embodiment, the LED will flash as the output at the D0 pin changes during proper BIST operation over the duration of method 28. To the contrary, however, note that in some instances of BIST failure, microsequencer 14 may completely stop issuing microaddresses due to the BIST failure. Given the LED technique described above, therefore, the LED will stop flashing in the event of such a failure. Consequently, if the LED stops flashing before the time expected for BIST to complete, it may be visibly determined that a BIST failure has occurred. Moreover, recall that group 20 of FIG. 2 represents a period where a 50 percent duty cycle should be applied to the LED under proper operation because of the logical toggling of the LSB. Therefore, as the LSBs corresponding to group 20 are output at the D0 data pin, a consistent flashing may be observed during this period. The above embodiments, therefore, further demonstrate the inventive flexibility, and still additional alternatives may be ascertained by a person skilled in the art FIGS. 4*a* and 4*b* illustrate a diagrammatic view of a testing configuration using various of the inventive aspects set forth above. Specifically, in FIG. 4*a*, a burn-in board 46 is shown to test a number of microprocessors configured in the manner of FIG. 1, and FIG. 4*b* illustrates a driver board 47 which may be connected to communicate signals to and from burn-in board 46. More particularly, burn-in board 46 is preferably placed in a burn-in oven as such ovens are known in the art. The oven typically has a heated chamber to enclose a number of burn-in boards (e.g., 52 burn-in boards) such as burn-in board 46. Moreover, immediately adjacent the heated chamber the oven preferably includes a nonheated area in which driver board 47 may be placed. Further, if the heated chamber includes multiple burn-in boards 46, then the non-heated area preferably includes corresponding multiple driver boards 47. Moreover, the edge connectors of each burn-in board 46 are situated to pass through some type of port or other electrical interface between the heated and non-heated chamber so as to communicate electrical signals between each burn-in board 46 and its corresponding driver board 47.

Turning more specifically to the example embodiment of burn-in board 46 in FIG. 4*a*, burn-in board 46 includes fifteen microprocessor sockets designated generally at 48, and combined with subscripts (i.e., $48_1$, through $48_{15}$) to distinguish each socket from the others. Within each socket 48 is connected a corresponding microprocessor abbreviated "MP", and again combined with subscripts to distinguish each microprocessor from the others. Burn-in board 46 includes various edge connectors for providing or receiving signals consistent with those to perform method 28 described above. Thus, the VCC and GND connectors provide reference potentials to each of the microprocessors, while the CLK connector is connected to a clock generator 50 (see FIG. 4*b*) for providing a single clocking signal to $MP_1$ through $MP_{15}$. Board 46 also includes a group of data pin edge connectors, where each pin is connected to a corresponding D0 data pin of a microprocessor (although explicit connections are not shown in FIG. 4*a* so as to simplify the Figure). As a convention to demonstrate the corresponding relationship, subscripts are used with respect to each D0 data pin edge connector and the matching microprocessor data pin D0 to which it is attached. For example, data pin edge connector $D0_1$ is connected to the D0 data pin of $MP_1$, data pin edge connector $D0_2$ is connected to the D0 data pin of $MP_2$, and so forth through data pin edge connector $D0_{15}$ being connected to the D0 data pin of $MP_{15}$. Lastly, each of the board edge connector data pins $D0_1$ through $D0_{15}$ is electrically connected to corresponding LEDs designated $LED_1$ through $LED_{15}$, respectively, with those LEDs being placed on burn-in board 46. More specifically, in the preferred embodiment, these LEDs are placed on the opposite edge of burn-in board 46 than are edge connector data pins $D0_1$ through $D0_{15}$ so that the LEDs will be more easily viewed through a window in the heated oven chamber. Moreover, to simplify FIG. 4a, note that the edge connectors on the left edge of board 46 are electrically connected to the corresponding LEDs toward the right edge of burn-in board 46 although the physical connections across the length of the board are not shown so as to simplify the Figure. Nevertheless, it should be known to a person skilled in the art that some electrical bus or the like provides a connection between each such data pin and its corresponding LED located toward the right edge of burn-in board 46.

Turning more specifically to FIG. 4b, it first includes each of the signals from burn-in board 46 of FIG. 4a to show the correspondence and/or connections to the signals of driver board 47. Looking then to driver board 47, it includes the above-introduced clock generator 50 for providing a clock signal to the CLK edge connector of burn-in board 46. The clocking signal from clock generator 50 is also connected to the input of a counter 52, which has an output connected to the input of a comparator 54. Comparator 54 provides control signals to the RESET and INIT edge connectors on board 46, where those connectors are connected to each of the RESET and INIT pins of $MP_1$ through $MP_{15}$. The RESET signal from comparator 54 is also connected to the RESET input of a comparator 56. Comparator 56 is also docked by the clock signal from clock generator 50, and also receives as inputs the signals from each of the D0 pins of the microprocessors on burn-in board 46 of FIG. 4a. Comparator 56 also provides two outputs which may be used on driver board 47, or may be connected to edge connectors for connection external to driver board 47. In either event, these two outputs include an INFORMATION INTERFACE signal (abbreviated "INFORMATION I/F" on FIG. 4b) and a FAILURE signal. In the preferred embodiment, the INFORMATION I/F signal is coupled to an external monitoring circuit such as a data logging computer for recording determinations of comparator 56 as described below. Also in the preferred embodiment, the FAILURE signal may be connected to drive some type of audiovisual device, such as an LED or audible alarm, thereby activating that audiovisual device when comparator 56 identifies a failure on burn-in board 46. Still further, driver board 47 either internally generates, or includes an edge connector for receiving, an EXTERNAL RESET signal. The EXTERNAL RESET signal is connected to counter 52 as well as comparator 54 to reset those device as described below. Lastly, although not shown, note that driver board 47 may include further diagnostic circuitry to detect failures of burn-in board 46 as well.

The testing techniques using burn-in board 46 may vary, and also may follow generally method 28 of FIG. 2 as further described below. In any event, note that burn-in board 46 further permits those techniques to be performed using burn-in parameters rather than normal operating parameters. For example, a normal operating range for the value of VCC is specified by a manufacturer, and may be on the order of 2.5 to 5 volts for modern microprocessors. However, during burn-in, and as described in the above Background Of The Invention, a value of VCC greater than the normal operating range is applied. Similarly, a normal operating range for the ambient operating temperature is also specified by a manufacturer, and may be on the order of 0 to 70° C. for modem microprocessors. Again, during burn-in, this parameter may be increased so that the ambient temperature is greater than the normal operating range for the microprocessor. For example, and as mentioned above, board 46 may be placed in an oven or similar heating environment to achieve a desired ambient temperature greater than normal operational range temperature. Still other parameters may be established at extremes beyond normal operating ranges as well. Thus, given the configuration of burn-in board 46, it may perform the following steps either under normal operating conditions, or under burn-in conditions as well.

Given the above, the preferred operation of driver board 47 to test burn-in board 46 is as follows, and assumes the reader is familiar with the more detailed discussion of method 28 presented above. The testing method begins by asserting the EXTERNAL RESET signal to reset the appropriate circuits shown in FIGS. 4a and 4b to begin the testing operation. In response to this RESET signal, comparator 54 asserts and then de-asserts RESET while INIT remains asserted. Thereafter, each of $MP_1$ through $MP_{15}$ commences a concurrent BIST and, accordingly, each outputs the LSB of its corresponding microaddress to its corresponding D0 data pin. This value is therefore connected to the corresponding D0 edge connector on board 46 and thus further connected to comparator 56 on driver board 47. As a result, comparator 56 may perform the above-described real time comparison of the input LSB with an LSB from a table which represents the expected LSB pattern for the corresponding microprocessor. In this regard, note also that comparator 56 is synchronized by the clock signal from clock generator 50 so that an input LSB is properly compared with the LSB from the pattern corresponding to the same clock cycle. In view of this operation, note that testing and result analysis may be achieved in various manners. For example, as comparator 56 performs its real time comparison, the results of that comparison are available via the INFORMATION I/F signal Therefore, a computer attached to the INFORMATION I/F signal may record these results, including the timing of any detected failures. Thus, this recorded information may be analyzed during the BIST. Alternatively, this recorded information may be analyzed after all BIST testing is complete rather than monitoring burn-in board 46 during the entire duration of the all BIST operations. As another example of result analysis, note that comparator 56 asserts the FAILURE signal upon detection of a BIST failure for any of $MP_1$ through $MP_{15}$. Therefore, any audiovisual device connected to the FAILURE signal is activated in response to the failure, thereby providing an additional indication of the test. Still further, during the successive BIST operations, each corresponding $LED_1$ through $LED_{15}$ on burn-in board 46 may be visually examined to determine if it flashes over successive clock cycles during the BIST, again in the manner described above.

Given the above, note that burn-in board 46 and driver board 47 provide a configuration whereby numerous microprocessors may be tested at once and, as stated above, such testing may be under burn-in or normal operating parameters. Moreover, note that once the BIST completes, it may be repeated numerous times. Specifically, recall that the clock signal from clock generator 50 is also connected to the input of counter 52, and the output of counter 52 is connected to the input of comparator 54. Consequently, comparator 54 may compare the number of counts by counter 52 with a value which represents a sufficient time for the BIST to complete (e.g., one million counts for a one million clock BIST). Once this value is reached, comparator 54 may re-start the BIST by again asserting and then de-asserting RESET while INIT remains asserted. Note further that when comparator 54 asserts the RESET signal, it also resets comparator 56 to once again begin comparing the inputs it receives from the multiple D0 pins to the expected pattern of LSBs as described above. Thus, this process may be repeated for any number of desired repetitions.

Having presented the above embodiments, one skilled in the art will appreciate various benefits and alternatives arising from those embodiments. For example, a single output pin may be monitored during BIST to externally evaluate the progression of the BIST from start to end. Thus, there is not a need to evaluate all, or even a large number of, the microprocessor output pins during BIST as is sometimes performed in the prior art. As another example, the external evaluation may be by way of a bit comparison with an expected pattern of bits, or may be by way of a visual indication such as an LED. As still another example, a failure during BIST may be identified before the BIST was scheduled to complete, and may be traced to a specific microinstruction to determine the particular fault within the microprocessor. As still another example, bits in addition to, or a bit other than, the LSB of the BIST microaddress may be viewed to ascertain a divergence in the actual and expected BIST microinstruction pattern. As still another example, the embodiments present the ability to test more than one microprocessor and, indeed, multiple sets of microprocessors at the same time, and further to provide one or more realtime and post-test indicators of a failure of any of the tested devices. As yet another example, the present embodiments may be included in numerous different types of microprocessors. These as well as other benefits demonstrate the flexibility of the present embodiments, as do the various alternatives set forth above. In all events, therefore, while the present embodiments have been described in detail, various substitutions, modifications or alterations could be made to the descriptions set forth above without departing from the inventive scope which is defined by the following claims.

We claim:

1. A microprocessor operating in response to a clock signal having a clock period, said microprocessor comprising:
    a readable memory, wherein said readable memory stores code for performing diagnostic evaluations of said microprocessor, wherein said diagnostic evaluations comprises a first evaluation to occur under non-failure operation at a first clock period and a last evaluation to occur under non-failure operation at a last clock period;
    circuitry for issuing a series of predetermined addresses to said readable memory to address said code for performing diagnostic evaluations of said microprocessor,
    a conductor externally accessible and for providing a signal from said microprocessor,
    circuitry for outputting a diagnostic signal on said conductor during performance of said diagnostic evaluations, wherein divergence of said diagnostic signal from a predetermined pattern before said last clock period indicates a failure of said diagnostic evaluations before said last clock period; and
    wherein said diagnostic signal comprises a portion of each of said series of predetermined addresses of said code.

2. The microprocessor of claim 1 wherein each of said series of predetermined addresses comprises a plurality of bits, and wherein said portion of each of said series of predetermined addresses comprises a least significant bit of each of said series of addresses.

3. The microprocessor of claim 2 wherein said predetermined pattern comprises a succession of signals such that every other signal in said succession of signals is a logical complement of an immediately preceding signal.

4. The microprocessor of claim 1:
    and further comprising an input for receiving an external enable signal; and
    wherein said circuitry for outputting a diagnostic signal on said conductor during performance of said diagnostic evaluations is responsive to said external enable signal to output said diagnostic signal to said conductor when said enable signal is in a first state and to not output said diagnostic signal to said conductor when said enable signal is in a second state.

5. The microprocessor of claim 4:
    and further comprising a plurality of data conductors, wherein each of said plurality of data conductors is for providing a data signal external from said microprocessor;
    wherein a selected data conductor of said plurality of data conductors is connected as said conductor for providing a diagnostic signal external from said microprocessor;
    wherein, when said external enable signal is in said first state said selected conductor is operable to output said diagnostic signal; and
    wherein, when said external enable signal is in said second state said selected conductor is operable to output said data signal.

6. The microprocessor of claim 1 wherein said predetermined pattern comprises a succession of signals such that every other signal in said succession of signals is a logical complement of an immediately preceding signal.

7. The microprocessor of claim 1:
    wherein readable memory comprises a read only memory; and
    wherein said code comprises microcode.

8. The microprocessor of claim 1:
    wherein said externally accessible conductor comprises a first externally accessible conductor;
    and further comprising:
        a second externally accessible conductor; and
        circuitry for receiving an enable signal from said second externally accessible conductor and in response for initiating said circuitry for issuing a series of addresses to issue a first address corresponding to said first evaluation.

9. A microprocessor operating in response to a clock signal having a clock period, said microprocessor, comprising:
    a readable memory, wherein said readable memory stores code for performing diagnostic evaluations of said microprocessor, wherein said diagnostic evaluations comprises a first evaluation to occur under non-failure operation at a first clock period and a last evaluation to occur under non-failure operation at a last clock period;
    an input for receiving an external enable signal;
    circuitry for issuing a series of predetermined addresses to said readable memory to address said code for performing diagnostic evaluations of said microprocessor;
    a conductor externally accessible and for providing a signal from said microprocessor;
    circuitry for outputting a diagnostic signal on said conductor during performance of said diagnostic evaluations, wherein divergence of said diagnostic signal from a predetermined pattern before said last clock period indicates a failure of said diagnostic evaluations before said last clock period;
    wherein said diagnostic signal comprises a least significant bit of each of said series of predetermined addresses of said code; and wherein said circuitry for outputting a diagnostic signal on said conductor during performance of said diagnostic evaluations is responsive to said external enable signal to output said diagnostic signal to said conductor when said enable signal is in a first state and to not output said diagnostic signal to said conductor when said enable signal is in a second state.

10. The microprocessor of claim 9 wherein said predetermined pattern comprises a succession of signals such that every other signal in said succession of signals is a logical complement of an immediately preceding signal.

11. The microprocessor of claim 9:
and further comprising a plurality of data conductors, wherein each of said plurality of data conductors is for providing a data signal external from said microprocessor;
wherein a selected data conductor of said plurality of data conductors is connected as said conductor for providing a diagnostic signal external from said microprocessor;
wherein, when said external enable signal is in said first state said selected conductor is operable to output said diagnostic signal; and
wherein, when said external enable signal is in said second state said selected conductor is operable to output said data signal.

12. The microprocessor of claim 9:
wherein said externally accessible conductor comprises a first externally accessible conductor;
and further comprising:
a second externally accessible conductor; and
circuitry for receiving an enable signal from said second externally accessible conductor and in response for initiating said circuitry for issuing a series of addresses to issue a first address corresponding to said first evaluation.

13. A microprocessor, comprising:
a readable memory, wherein said readable memory stores microcode for performing diagnostic evaluations of said microprocessor;
circuitry for issuing a series of predetermined addresses to said readable memory to address said microcode for performing diagnostic evaluations of said microprocessor;
a conductor for providing a signal external from said microprocessor; and
circuitry for outputting a portion of each of said series of predetermined addresses of said microcode to said conductor.

14. The microprocessor of claim 13 wherein each of said series of predetermined addresses comprises a plurality of bits, and wherein said portion of each of said series of addresses comprises a least significant bit of each of said series of addresses.

15. A method of testing a microprocessor, comprising the steps of:
coupling a voltage to said microprocessor, wherein said microprocessor operates responsive to said voltage and in response to a clock signal;
issuing a series of predetermined addresses to a readable memory in said microprocessor, wherein each address of said series of predetermined addresses addresses a respective code in said readable memory for performing diagnostic evaluations of said microprocessor, wherein said diagnostic evaluations comprises a first evaluation to occur under non-failure operation at a first clock period and a last evaluation to occur under non-failure operation at a last clock period;
outputting a diagnostic signal to a conductor externally accessible from said microprocessor during performance of said diagnostic evaluations, wherein said diagnostic signal comprises a portion of each of said series of predetermined addresses of said code; and
comparing said diagnostic signal to a predetermined pattern before said last clock period, wherein divergence of said diagnostic signal from said predetermined pattern before said last clock period indicates a failure of said diagnostic evaluations before said last clock period.

16. The method of claim 15 and further comprising the step of displaying a visible indication responsive to said diagnostic signal.

17. The method of claim 16 wherein said step of displaying a visible indication comprises coupling said diagnostic signal to a light responsive device such that said light responsive device emits a first indication in response to said diagnostic signal being in a first state and said light responsive device emits a second indication, different from the first indication, in response to said diagnostic signal being in a second state.

18. The method of claim 15:
wherein said microprocessor has a normal operating voltage range; and
wherein said step of coupling a voltage comprises coupling a voltage in said normal operating voltage range.

19. The method of claim 15:
wherein said microprocessor has a normal operating voltage range; and
wherein said step of coupling a voltage comprises coupling a voltage greater than said normal operating voltage range.

20. The method of claim 15:
wherein said microprocessor has a normal operating temperature range; and
wherein each of said coupling, issuing, and outputting steps are performed while said microprocessor is exposed to a temperature within said normal operating temperature range.

21. The method of claim 15:
wherein said microprocessor has a normal operating temperature range; and
wherein each of said coupling, issuing, and outputting steps are performed while said microprocessor is exposed to a temperature greater than said normal operating temperature range.

22. The method of claim 15:
wherein said microprocessor has a normal operating voltage range;
wherein said step of coupling a voltage comprises coupling a voltage greater than said normal operating voltage range;
wherein said microprocessor has a normal operating temperature range; and
wherein each of said coupling, issuing, and outputting steps are performed while said microprocessor is exposed to a temperature greater than said normal operating temperature range.

23. The method of claim 15 wherein said microprocessor and further comprising the steps of:
coupling a voltage to a plurality of microprocessors in addition to said microprocessor, wherein each of said plurality of microprocessors operates responsive to said voltage and in response to a clock signal;

at the same time as said step of issuing a series of addresses to a readable memory in said first microprocessor, the step of issuing a series of addresses to a respective readable memory in each of said plurality of microprocessors, wherein each address of said series addresses a respective code in said readable memory for performing diagnostic evaluations of said microprocessor, wherein said diagnostic evaluations comprises a first evaluation to occur under non-failure operation at a first clock period and a last evaluation to occur under non-failure operation at a last clock period;

for each of said plurality of microprocessors, the steps of:

outputting a diagnostic signal to a conductor externally accessible from said microprocessor during performance of said diagnostic evaluations; and comparing said diagnostic signal to a predetermined pattern before said last clock period, wherein divergence of said diagnostic signal from said predetermined pattern before said last clock period indicates a failure of said diagnostic evaluations before said last clock period.

24. The method of claim 23 and further comprising the step of activating an audiovisual device in response to divergence of said diagnostic signal from any of said microprocessor or said plurality of microprocessors from said predetermined pattern before said last clock period indicates a failure of said diagnostic evaluations before said last clock period.

25. The method of claim 23 and further comprising the step of recording said diagnostic signal from said microprocessor and said plurality of microprocessors.

* * * * *

UNITED STATES PATENT AND TRADEMARK OFFICE
CERTIFICATE OF CORRECTION

Page 1 of 1

PATENT NO. : 6,061,811
DATED : May 9, 2000
INVENTOR(S) : James O. Bondi, Plano; Joel J. Graber, Donald E. Steiss, both of Richardson; John M. Johnsen, Dallas, all of Tex.

It is certified that error appears in the above-identified patent and that said Letters Patent is hereby corrected as shown below:

Title page,
Insert the following "Related U.S. Applications Data":

[60]    Provisional Application No. 60/029,347 filed Oct. 31, 1996.

Signed and Sealed this

Fifteenth Day of January, 2002

Attest:

Attesting Officer

JAMES E. ROGAN
Director of the United States Patent and Trademark Office